UNITED STATES PATENT OFFICE.

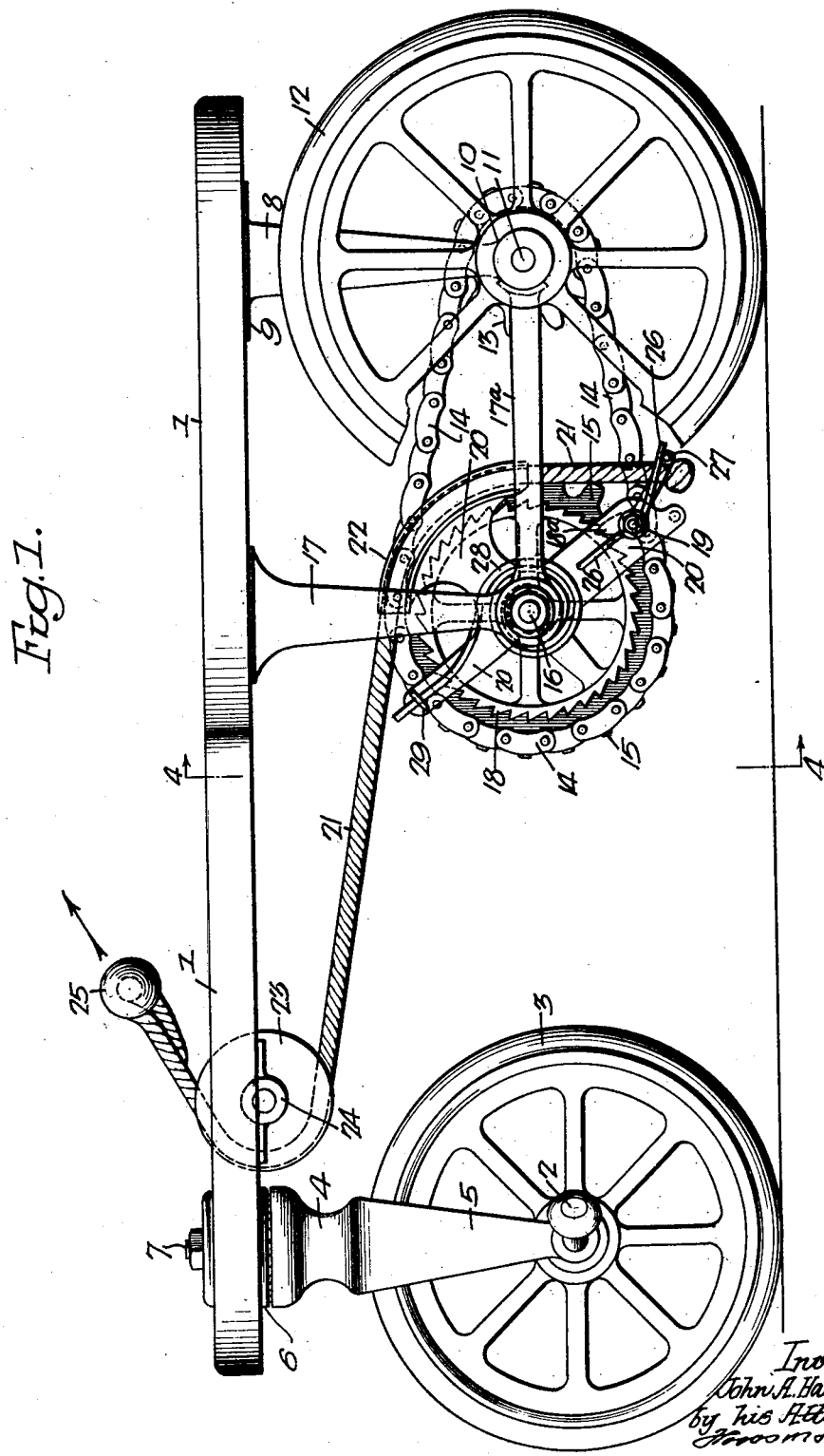

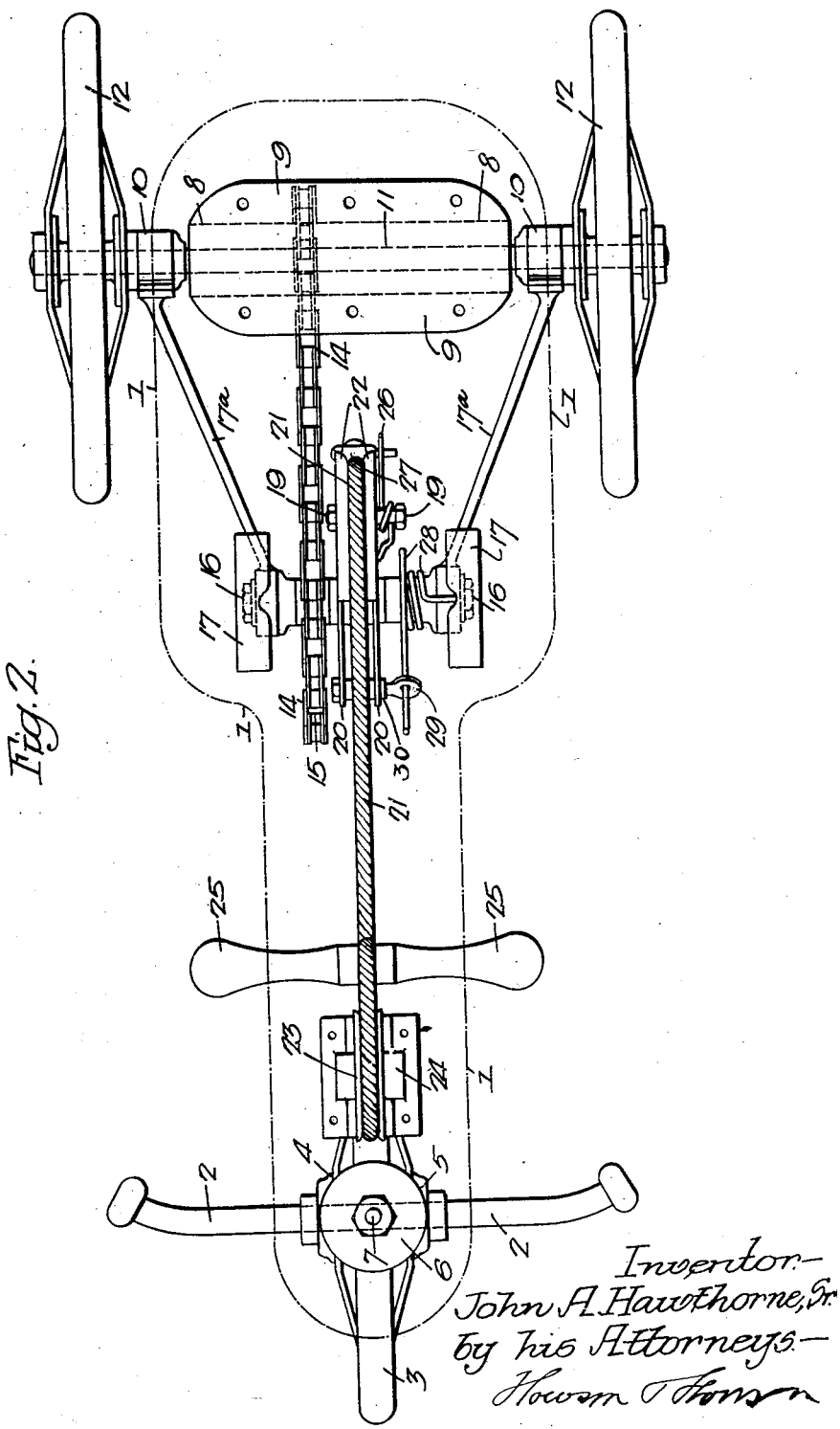

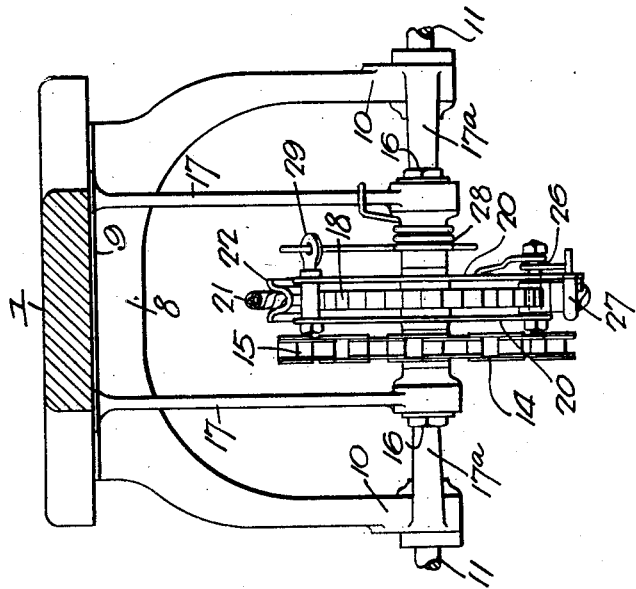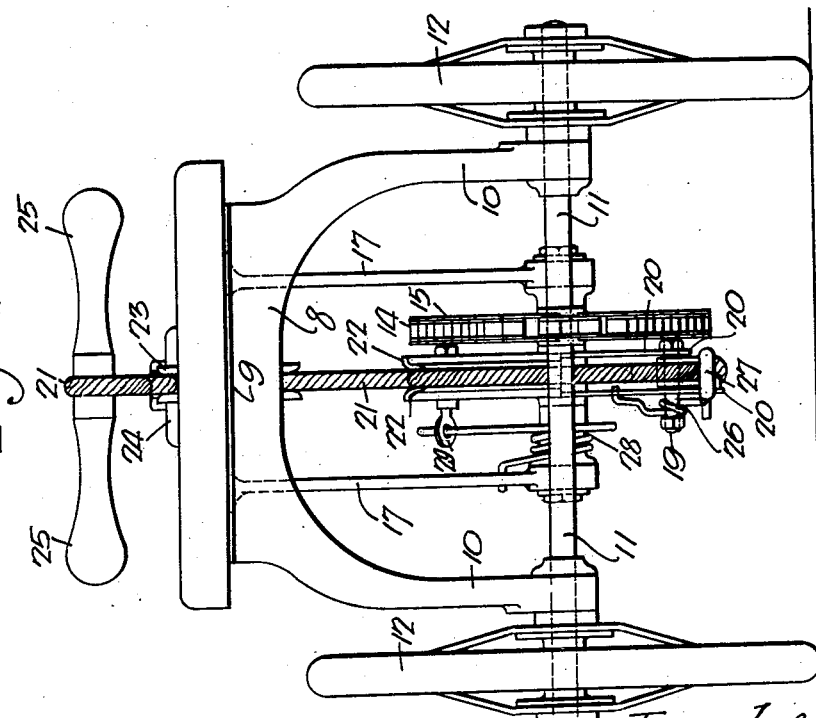

JOHN A. HAWTHORNE, SR., OF PHILADELPHIA, PENNSYLVANIA.

HAND-PROPELLED VEHICLE.

1,409,103.  Specification of Letters Patent.  Patented Mar. 7, 1922.

Application filed February 11, 1921. Serial No. 444,191.

*To all whom it may concern:*

Be it known that I, JOHN A. HAWTHORNE, Sr., a citizen of the United States, residing in Philadelphia, Pennsylvania, have invented certain Improvements in Hand-Propelled Vehicles, of which the following is a specification.

This invention relates to certain improvements in vehicles especially adapted for the use of children, in which a seat is provided for the user. A foot rest is carried by the front wheel structure for the purpose of steering. Means, operated by the hands, is provided for propelling the vehicle.

The object of the present invention is to provide means for propelling a vehicle of this type more rapidly than heretofore and also to provide a simple pawl and ratchet mechanism.

The invention also relates to certain details of construction fully described hereafter.

In the accompanying drawings,

Fig. 1 is a side view of my improved hand propelled vehicle with one of the rear wheels partly broken away;

Fig. 2 is a plan view with the seat board in dotted lines;

Fig. 3 is a rear end view; and

Fig. 4 is a sectional view on the line 4—4, Fig. 1.

Referring to the drawings, 1 is the seat board, which extends the full length of the vehicle. The board is increased in width at the rear so that a child can sit comfortably on the board with the legs on each side of the reduced portion, the feet resting on the cross bar 2, shaped as shown in Fig. 2. This cross bar forms the axle for the front wheels 3 and a ball bearing may be located between the wheel and the axle, if desired.

4 is the forked front frame having arms 5 extending down on each side of the wheel and forming the bearings in which the cross bar 2 is mounted. The upper portion of the frame is pivoted to a plate 6 by a bolt 7 forming a center pin on which the front wheel structure is turned. A ball bearing is located between the plate 6 and the frame 4.

8 is the rear frame having an extension plate 9, which is secured to the under side of the seat board 1. This frame has arms 10 forming bearings for the rear axle 11. Secured to the axle are rear wheels 12 of any suitable type. Also secured to the axle is a sprocket wheel 13 around which passes a drive chain 14 from a sprocket wheel 15 secured to the shaft 16 carried by a bearing 17. This bearing is secured to the under side of a seat board and has a strut member 17$^a$, which is attached to the lower portion of the rear bearing frame 8 so that the frame rigidly supports the shaft 16. Also secured to the shaft 16 is a ratchet wheel 18 having teeth arranged, as shown, and engaging the teeth of this ratchet wheel is a pawl 18$^a$ pivoted at 19 to a frame 20, loosely mounted on the shaft 16. The pawl has an arm 27 to which is attached the rope 21, which passes around a segmental guide 22 on the frame 20 and to a wheel 23 mounted in bearings 24 at the front of the vehicle. This bearing extends through a slot in the seat board and the rope also extends through this slot and has a handle 25 attached to its end. The handle is so shaped that it can be grasped by both hands of the child propelling the vehicle. A spring 26, mounted on the pivot 19 of the pawl, has one end attached to the frame 20 and the other end engages a projection on the pawl arm 27 tending to throw the pawl out of engagement with the ratchet teeth, while the pull on the rope 21 overcomes the spring and forces the pawl into engagement with the ratchet teeth so that when the rope is pulled in the direction of the arrow, Fig. 1, the pawl will be forced into engagement with the teeth and the ratchet wheel and its sprocket wheel 15 will be rotated.

In order to return the frame 20, after being pulled by the rope, a coiled spring 28 is provided, which is wrapped around the bearing and one end of the spring is attached to the bearing, as shown in Fig. 2, while the other end passes through an eye in a lug 29 projecting from a bolt 30 in the frame 20 so that the frame is reciprocated, being moved in one direction by a pull on the rope and returned by a pull on the spring.

As soon as the operator ceases to pull on the rope, the spring 26 withdraws the pawl and the spring 28 returns the frame 20 to the position illustrated in Fig. 1. In the meantime the momentum carries the vehicle forward and the movement of the vehicle is substantially continuous.

The frame 20, in the present instance, is made in two parts, one part being located on one side of the ratchet wheel and the other part on the opposite side. These two parts are connected by the segment 22, the pivot bolt 19 and the bolt 30. Ball bearings may be provided at any point desired, or they may be omitted.

I claim:

1. The combination in a hand propelled vehicle, of a seat board; a front frame pivoted to the forward end of the seat board; a wheel mounted thereon; foot supports on the frame; a rear frame; an axle mounted in the rear frame; wheels secured to the axle; a sprocket wheel, also secured to the axle; an intermediate frame; a shaft mounted thereon; a sprocket wheel secured to the shaft; a drive chain passing around the two sprocket wheels; a ratchet wheel, also secured to the shaft; a frame pivotally mounted on the shaft and having a segmental guide carried by the frame; a pawl; a rope attached to the pawl and passing over the segmental guide, said rope extending through an opening in the seat board and having a handle; and a spring for retracting the pawl frame after it has been turned by a pull on the rope.

2. The combination of a seat section; a pivoted front frame; a wheel mounted thereon; foot supports extending on each side of the frame by which the device is steered; a rear frame; an axle mounted in the rear frame; wheels secured to the axle; a sprocket wheel secured to the axle; an intermediate frame secured to the under side of the seat section and having struts extending to the rear frame; a shaft mounted in the frame; a sprocket wheel secured to the shaft; a drive chain passing around the two sprocket wheels; a ratchet wheel, also secured to the shaft; a frame pivotally mounted on the axle; a pawl pivoted to the frame; a spring tending to force the pawl out of engagement with the teeth of the ratchet wheel; a rope attached to the pawl; a segment on the frame around which the rope extends; a guide for the rope extending through the seat board; a handle secured to the end of the rope; and a spring acting on the frame to return the frame after being moved by the rope, the parts being so arranged that the pull on the rope will move the pawl into engagement with the ratchet wheel so that the rope wheel and the drive chain will be turned in one direction.

3. The combination in a device for propelling hand propelled vehicles, of a seat frame; front and rear wheels; bearings therefor; an intermediate frame; a shaft mounted therein; a ratchet wheel secured to the shaft; means for driving the rear wheels from the said shaft; a frame loosely mounted on the shaft and made in two sections, one section being on one side of the ratchet wheel and the other being on the opposite side; a segment and bolts connecting the two sections; a pawl pivotally mounted on one of said bolts and having an arm; a spring tending to force the pawl out of engagement with the ratchet wheel; a rope attached to the arm of the pawl and passing around the segment of the frame; and a spring mounted on the bearing of the shaft and having one end attached to the bearing, the other end being connected to the frame so that on the pull of the rope the pawl will be moved into engagement with the ratchet wheel and when the pull on the rope is discontinued the spring attached to the frame will return the pawl to its first position.

JOHN A. HAWTHORNE, Sr.